United States Patent
Hofmann et al.

[11] Patent Number: 5,998,327
[45] Date of Patent: Dec. 7, 1999

[54] ZINC/METAL HEXACYANOCOBALTATE COMPLEX COMPOUNDS, A PROCESS FOR THEIR PREPARATION, AND THEIR USE IN A PROCESS FOR THE PRODUCTION OF POLYETHER POLYOLS

[75] Inventors: Jörg Hofmann, Krefeld; Pramod Gupta, Bedburg; Harald Pielartzik; Pieter Ooms, both of Krefeld; Walter Schäfer, Leighlingen, all of Germany

[73] Assignee: Bayer Aktiengesellschaft, Leverkusen, Germany

[21] Appl. No.: 09/114,359

[22] Filed: Jul. 13, 1998

[30] Foreign Application Priority Data

Jul. 16, 1997 [DE] Germany .......................... 197 30 467

[51] Int. Cl.$^6$ ..................................... B01J 27/26
[52] U.S. Cl. ............................................. 502/175
[58] Field of Search ....................... 502/175, 102

[56] References Cited

U.S. PATENT DOCUMENTS

| | | | |
|---|---|---|---|
| 3,404,109 | 10/1968 | Milgrom | 260/611 |
| 3,829,505 | 8/1974 | Herold | 260/611 B |
| 3,941,849 | 3/1976 | Herold | 260/607 A |
| 5,010,047 | 4/1991 | Schuchardt | 502/24 |
| 5,158,922 | 10/1992 | Hinney et al. | 502/175 |
| 5,470,813 | 11/1995 | Le-Khac | 502/175 |
| 5,811,829 | 9/1998 | Lawrey et al. | 252/182.24 |
| 5,900,384 | 5/1999 | Soltani-Ahmadi et al. | 502/175 |
| 5,919,888 | 7/1999 | Lawrey et al. | 528/59 |

FOREIGN PATENT DOCUMENTS

| | | |
|---|---|---|
| 0 090 444 | 10/1983 | European Pat. Off. . |
| 0 090 445 | 10/1983 | European Pat. Off. . |
| 0 283 148 | 9/1988 | European Pat. Off. . |
| 4145123 | 5/1992 | Japan . |

*Primary Examiner*—Joseph K. McKane
*Attorney, Agent, or Firm*—Joseph C. Gil; N. Denise Brown

[57] ABSTRACT

The invention relates to novel zinc/metal hexacyanocobaltate complex compounds corresponding to the formula:

$$Zn_{3-v}M_v[Co(CN)_6]_2 \cdot w(H_2O) \cdot x(L) \cdot y[Zn(X)_n] \cdot z[M(Y)_m)].$$

These complex compounds are suitable catalysts. This invention also relates to a process for the production of the compounds, and to the use of the compounds in a process for the production of polyether polyols.

These novel zinc/metal hexacyanocobaltate complex compounds when used as catalysts in a process for the production of polyether polyols substantially reduce the induction period of the polyaddition reaction of alkylene oxides to starter compounds containing hydrogen atoms. Furthermore, the resultant polyether polyols have a significantly narrower molecular weight distribution.

11 Claims, No Drawings

ZINC/METAL HEXACYANOCOBALTATE COMPLEX COMPOUNDS, A PROCESS FOR THEIR PREPARATION, AND THEIR USE IN A PROCESS FOR THE PRODUCTION OF POLYETHER POLYOLS

BACKGROUND OF THE INVENTION

The present invention relates to new zinc/metal hexacyano-cobaltate complex compounds which can be used as catalysts, to a process for their production, and to the production of polyether polyols from these novel zinc/metal hexacyano-cobaltate complex compounds.

Double metal cyanide (DMC) complex compounds are known to be suitable catalysts for the polyaddition of alkylene oxides to starter compounds containing active hydrogen atoms. Such catalysts and processes for producing polyether polyols from these catalysts are as described in, for example, U.S. Pat. Nos. 3,404,109, 3,829,505, 3,941,849 and 5,158,922. In particular, the use of these double metal cyanide complex compounds as catalysts for the production of polyether polyols leads to a reduction of the proportion of monofunctional polyethers containing terminal double bonds, so-called monools, in comparison to the conventional production of polyether polyols using alkali metal catalysts, such as alkali metal hydroxides.

U.S. Pat. No. 5,470,813 and JP Patent 4,145,123 disclose improved double metal cyanide complex compounds that enable the proportion of mono-functional polyethers containing terminal double bonds to be reduced still further in the production of polyether polyols. Furthermore, the use of the improved double metal cyanide complex compounds reduces the induction time in the polyaddition reaction of the alkylene oxides to corresponding starter compounds and also increases the catalyst activity.

The object of the present invention is to provide further improved double metal cyanide (DMC) complex compounds which are suitable for use as catalysts in a process for the polyaddition of alkylene oxides to corresponding starter compounds, wherein these catalysts have a considerably reduced induction period compared to the previously known types of catalysts. A reduction of the induction period results in an improved economy of the process by decreasing the cycle time of the polyether polyol production. A further aim of the present invention is to achieve as narrow a molecular weight distribution as possible in the polyether polyols which are produced. The narrowest possible molecular weight distribution in the polyols is of great advantage for their processing into high-grade polyurethanes such as, for example, elastomers.

DESCRIPTION OF THE INVENTION

The present invention provides new zinc/metal hexacyanocobaltate complex compounds which are suitable catalysts corresponding to the formula:

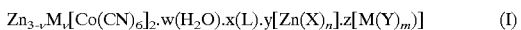

$$Zn_{3-v}M_v[Co(CN)_6]_2 \cdot w(H_2O) \cdot x(L) \cdot y[Zn(X)_n] \cdot z[M(Y)_m] \quad (I)$$

wherein:

M represents a divalent metal atom selected from the group consisting of cadmium (II), mercury (II), palladium (II), platinum (II), vanadium (II), magnesium (II), calcium (II), barium (II), iron (II), nickel (II), manganese (II), cobalt (II), tin (II), lead (II), strontium (II) and copper (II), X and Y are the same or different and each represents a halide, or a hydroxy, a sulfate, a carbonate, a cyanate, a thiocyanate, an isocyanate, an isothiocyanate, a carboxylate, an oxalate or a nitrate group, L represents an organic complex ligand selected from the group consisting of alcohols, aldehydes, ketones, ethers, esters, amides, ureas, nitrites and sulfides, v represents a number from 0.005 to 2.995,
w represents a number from 0.1 to 10,
x represents a number from 0.01 to 10,
y represents a number from 0.001 to 3.0,
z represents a number from 0,001 to 3.0, and
m and n are the same or different, and each represents the number 1 or 2.

Particularly preferred are zinc/metal hexacyanocobaltates corresponding to the above formula wherein:

M represents a divalent metal atom selected from the group consisting of cadmium (II), mercury (II), palladium (II), platinum (II), vanadium (II), magnesium (II), calcium (II) and barium (II), X and Y are the same or different, and each represents a halide, preferably chloride or bromide, L represents an organic complex ligand selected from the group consisting of alcohols, ketones and ethers, and v represents a number from 0.01 to 2.99, with w, x, y, z, m and n being defined as above for formula (I).

Particularly suitable compounds to be used as ligands L with ether bonds are those compounds which are capable of chelate formation with the metals. Some examples of suitable ligands are: methanol, ethanol, propanol, isopropanol, butanol, hexanol, octanol, tert.-butanol, formalde-hyde, acetaldehyde, propion-aldehyde, butyraldehyde, i-butyraldehyde, glyoxal, benzaldehyde, tolualdehyde, acetone, methyl ethyl ketone, 3-pentanone, 2-pentanone, 2-hexanone, 2,4-pentanedione, 2,5-hexane-dione, 2,4-hexanedione, m-dioxan, p-dioxan, trioxy-methylene, paralde-hyde, diethyl ether, 1-ethoxypentane, bis(β-chloroethyl)ether, bis(β-ethoxyethyl)ether, dibutyl ether, ethyl propyl ether, bis(β-methoxyethyl)-ether, dimethoxyethane (glyme), diethylene glycol dimethyl ether (diglyme), tri-ethylene glycol dimethyl ether, dimethoxymethane, methyl propyl ether, poly-alkyleneoxide polyols, formamide, acetamide, propion-amide, butyramide, valeramide, N,N'-dimethylacetamide, amyl formate, ethyl formate, n-hexyl formate, n-propyl formate, ethyl ethanoate, methyl acetate, methyl propionate, triethylene glycol diacetate, acetonitrile, propionitrile, butyronitrile, dimethyl sulfide, diethyl sulfide, dibutyl sulfide, dipropyl sulfide, diamyl sulfide, 1,1,3,3-tetramethyl urea and 1,1,3,3-tetraethyl urea.

Preferred zinc/metal hexacyanocobaltate complex compounds (which are preferably catalysts) include those corresponding to the general formula:

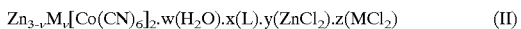

$$Zn_{3-v}M_v[Co(CN)_6]_2 \cdot w(H_2O) \cdot x(L) \cdot y(ZnCl_2) \cdot z(MCl_2) \quad (II)$$

wherein:

v represents a number from 0.005 to 2.995
w represents a number from 0.1 to 10,
x represents a number from 0.01 to 10, and
y and z are the same or different, and each represents a number of from 0.001 to 3.0, with M and L being defined as in formula (I) above.

Of these preferred complex compounds, it is most preferred that M, X and Y, L, and m and n, are selected such that the compositions correspond to the general formula:

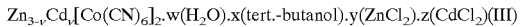

$$Zn_{3-v}Cd_v[Co(CN)_6]_2 \cdot w(H_2O) \cdot x(tert.-butanol) \cdot y(ZnCl_2) \cdot z(CdCl_2) \quad (III)$$

wherein:

v represents a number from 0.005 to 2.995 w represents a number from 0.1 to 10,
x represents a number from 0.01 to 10, and
y and z are the same or different, and each represents a number of from 0.001 to 3.0.

The present invention also provides a process for the preparation of the previously described zinc/metal hexacyanocobaltate catalysts.

These zinc/metal hexacyanocobaltate complex compounds which are suitable for use as catalysts are prepared by
A) reacting
  (1) a 1 to 90% by weight aqueous solution of
    (a) a zinc salt corresponding to the formula $Zn(X)_n$, and
    (b) a metal salt corresponding to the formula $M(Y)_m$, wherein:
      M represents a divalent metal atom selected from the group consisting of cadmium (II), mercury (II), palladium (II), platinum (II), vanadium (II), magnesium (II), calcium (II), barium (II), iron (II), nickel (II), manganese (II), cobalt (II), tin (II), lead (II), strontium (II) and copper (II),
      X and Y are the same or different and each represents a halide, or a hydroxy, a sulfate, a carbonate, a cyanate, a thiocyanate, an isocyanate, an isothiocyanate, a carboxylate, an oxalate or a nitrate group,
      and
      m and n are the same or different, and each represents the number 1 or 2;
  with
  (2) a 0.5 to 50% by weight aqueous solution of a cobalt (III)-cyanide salt corresponding to the formula:

$$M'_3[Co(CN)_6]_r \qquad (IV)$$

wherein:
    r represents 1 or 2,
    and
    M' represents an alkali metal atom or an alkaline earth metal atom,
in the presence of organic complex ligands of the formula L, wherein:
L represents an organic complex ligand selected from the group consisting of alcohols, aldehydes, ketones, ethers, esters, amides, ureas, nitrites and sulfides;
and wherein the salts $Zn(X)_n$, $M(Y)_m$, the cobalt (III) cyanide salt, and the complex ligand L are present in amounts such that:
(i) the molar ratio of zinc and metal M to cobalt (III) is 2:1 to 10:1.
(ii) the molar ratio of zinc and metal M to ligand L is 1:100 to 100:1,
and
(iii) the molar ratio of zinc salt $Zn(X)_n$ to metal salt $M(Y)_m$ is 500:1 to 1:500.

Particularly suitable cobalt (III) cyanide salts corresponding to formula (IV) above are those salts wherein M' represents sodium, potassium, lithium or calcium, and most preferably potassium.

the process of preparing these novel zinc/metal hexacyano-cobaltate complex compounds, it is preferred to use a 5 to 70% by weight concentration of aqueous solution of the zinc salt $(Zn(X)_n)$ and metal salt $(M(Y)_m)$ in the reaction. The aqueous solution of the cobalt (III) cyanide salts is preferably used in a concentration of 1 to 30% by weight.

It is preferred in the process of preparing these zinc/metal hexacyanocobaltate complex compounds that the salts $Zn(X)_n$, $M(Y)_m$, the cobalt (III) cyanide salt, and the complex ligand L are present in amounts such that:
(i) the molar ratio of zinc and metal M to cobalt (III) is 2.25:1 to 8:1.
(ii) the molar ratio of zinc and metal M to ligand L is 1:50 to 50:1,
and
(iii) the molar ratio of zinc salt $Zn(X)_n$ to metal salt $M(Y)_m$ is in the range from 300:1 to 1:300.

In the process of preparing the zinc/metal hexacyanocobaltate complex compounds of the present invention, preferred compounds to be used as the zinc salt $Zn(X)_n$ include compounds such as, for example, zinc chloride, zinc bromide, zinc iodide, zinc acetate, zinc acetylaceto-nate, zinc carbonate hydroxide, zinc fluoride, zinc nitrate, zinc sulfate, zinc benzoate, zinc carbonate, zinc citrate, zinc formate, zinc thiocyanate, mixtures of various zinc salts, etc. Particularly preferred compounds are zinc chloride and zinc bromide.

Preferred compounds to be used as metal salt $M(Y)_m$ in the process of preparing the compositions of this invention include compounds such as, for example, cadmium chloride, mercury chloride, palladium chloride, platinum chloride, vanadium chloride, calcium chloride, barium chloride, barium nitrate, calcium bromide, calcium formate, calcium iodide, calcium oxalate, calcium propionate, cadmium acetate, cadmium bromide, cadmium iodide, cadmium sulfate, palladium acetate, palladium nitrate, mercury acetate, mercury nitrate, magnesium chloride, manganese chloride, iron sulfate, iron acetate, iron bromide, iron chloride, iron iodide, iron nitrate, iron thiocyanate, cobalt chloride, cobalt bromide, cobalt acetate, cobalt iodide, cobalt nitrate, cobalt sulfate, nickel chloride, nickel bromide, nickel iodide, nickel nitrate, nickel sulfate, strontium chloride, copper chloride, lead chloride, mixtures of various metal salts, etc. More preferred metal salts are the metal halides, with the chlorides and bromides being most preferred.

Compounds which are preferably used as cobalt (III) cyanide salts corresponding to (IV) above in the process of preparing the catalysts of the invention include, for example, lithium hexacyanocobaltate (III), sodium hexacyanocobaltate (III), potassium hexacyanocobaltate (III), calcium hexacyanocobaltate (III), mixtures of various cobalt (III) cyanide salts, etc. Potassium hexacyanocobaltate (III) is particularly preferred.

The alcohols, ketones and ethers which are disclosed hereinabove as being suitable as complex ligands L are preferably used in the process of preparing the catalysts according to the invention. These ligands may be used either individually or in combination with one another.

The complex compositions, particularly catalysts, of the invention are prepared by mixing the two aqueous solutions of the previously described metal salts at 10° to 80° C., and preferably 20° to 60° C. In accordance with the present invention, the aqueous solution of the aforementioned zinc salts $Zn(X)_n$ and metal salts $M(Y)_m$ may be added to the aqueous solution of the cobalt (III) cyanide salts. In principle, it is also possible to add the aqueous cobalt (III) cyanide salt solution to the aqueous solution of the aforementioned zinc salts and metal salts.

In the process of preparing the novel zinc/metal hexacyano-cobaltate complex compounds (e.g., catalysts) of the present invention, it is particularly advantageous if the two aqueous solutions are intensively mixed with one another. It may also be advantageous to pass the aqueous cobalt (III) cyanide salt solution through an ion exchange column containing an acid ion exchanger (H form) before being mixed with the aqueous zinc salt/metal salt solution.

After the two aqueous solutions are mixed together, the novel zinc/metal hexacyanocobaltate complex compound (preferably catalyst) precipitates out of the solution. The precipitated complex compound is then treated with one or more of the previously described complex ligands L.

Obviously, it is also possible to add the organic complex ligand L to the aqueous solutions of the previously described metal salts. Another possibility is to add the organic complex ligands to the suspension obtained after mixing the aqueous solutions of the metal salts.

The process for preparing these new zinc/metal hexacyano-cobaltate catalysts is in principle known, and is, for example, as described in detail in the aforementioned prior art.

In order to improve the activity of the complex compounds of the present invention to be used as catalysts, it is advantageous to treat the compound obtained by this process by, for example, filtration or centrifugation, in addition with water or with the previously described organic complex ligands, optionally in the presence of water. By treating the prepared compound (catalyst) in this or another similar manner, any water-soluble by-products such as, for example, potassium chloride, can be removed from the catalyst. This and other such by-products could adversely affect the polyaddition reaction of alkylene oxides to starter compounds when these are used as catalysts in the process of producing polyether polyols in accordance with the present invention.

The complex compound (e.g., catalyst) which has been treated with water and/or the organic complex ligands is then dried, optionally after pulverization, at temperatures of 20° to 100° C. and pressures of 0.1 mbar to normal pressure (1013 mbar).

Another aspect of the present invention provides for the production of polyether polyols by the polyaddition of alkylene oxides to starter compounds containing active hydrogen atoms, in the presence of suitable catalysts wherein the catalysts comprise the novel zinc/metal hexacyano-cobaltate complex compounds as described hereinabove. Preferred alkylene oxides include compounds such as, for example, ethylene oxide, propylene oxide, butylene oxide, as well as mixtures thereof. The formation of the polyether chains by alkoxylation may be carried out, for example, by using only one monomeric epoxide, or it may also be effected statistically or block-wise using two or three different monomeric epoxides. Further details concerning the process of producing polyether polyols of the present invention are disclosed in, for example, "Ullmanns Encyclopädie der industriellen Chemie", English-language Edition, 1992, Vol. A21, pp. 670–671.

Suitable starter compounds containing active hydrogen atoms to be used in the process of producing polyether polyols include, for example, those compounds having molecular weights of 18 to 2,000 and containing 1 to 8 hydroxyl groups. Some examples of suitable compounds include ethylene glycol, diethyl glycol, 1,2-propylene glycol, 1,4-butanediol, hexamethylene glycol, bisphenol A, trimethylol propane, glycerol, pentaerythritol, sorbitol, cane sugar, decomposed starch, water, etc.

It is preferred that the starter compounds which contain active hydrogen atoms have been produced by, for example, conventional alkaline catalysis from the previously disclosed low molecular weight starter compounds, and represent oligomeric alkoxylation products with molecular weights of 200 to 2,000.

The polyaddition of alkylene oxides to starter compounds which contain active hydrogen atoms is catalyzed by the novel zinc/metal hexacyanocobaltate catalysts as described above is, in general, carried out at temperatures from 20° to 200° C., preferably in the range from 40° to 180° C., more preferably at temperatures from 50° to 150° C. The reaction may be carried out at normal pressure or at pressures of 0 to 20 bar (absolute). The polyaddition may be carried out in bulk or in an inert, organic solvent such as, for example, toluene and/or THF, etc. The amount of solvent used is normally from about 10 to about 30% by weight, based on the final amount of polyether polyol.

The quantity of catalyst to be used in the process is selected such that the polyaddition reaction can be suitably and reliably controlled under the given reaction conditions. This quantity of catalyst is generally in the range of from 0.0005% by weight to 1% by weight, preferably in the range from 0.001% by weight to 0.1% by weight, based on the final amount of polyether polyol.

The reaction times for the polyaddition of the alkylene oxides to suitable starter compounds are in the range from a few minutes up to several days, and preferably several hours.

The molecular weights (number average, determined by end group analysis) of the polyether polyols produced by the process according to the invention are in the range from 500 to 100,000 g/mol, preferably in the range from 1,000 to 50,000 g/mol, more preferably in the range from 2,000 to 20,000 g/mol.

The polyaddition may be carried out either continuously, or in a batch or semi-batch process.

The novel catalysts of the present invention generally require an induction period which ranges from a few minutes up to several hours.

By substituting the novel catalysts of the present invention for the previously known DMC catalysts of the prior art in the process for the production of polyether polyols, the induction period for the reaction is reduced by about 30%.

In addition, the molecular weight distribution $M_w/M_n$ (determined by MALDI-TOF-MS, see U. Bahr, A. Deppe, M. Karas, F. Hillenkamp, U. Giessmann, Analytical Chemistry 64, (1992), S. 2866–2869 and B. Trathnigg, B. Maier, G. Schulz, R. -P. Krüger, U. Just, Macromol. Symp. 110, (1996), S. 231–240) of the polyether polyols produced using the novel zinc/metal hexacyano-cobaltate catalysts of the present invention is about 1.01 to about 1.07. Accordingly, this is considerably narrower than the molecular weight distribution of the polyether polyols produced using the previously known DMC catalysts as described in the prior art. This is demonstrated in the following examples.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Catalyst preparation:

Comparison Example 1

Preparation of zinc hexacyanocobaltate (III) DMC catalyst with tert.-butanol as organic complex ligand. (This catalyst is referred to as Catalyst A throughout the examples; the synthesis process was as described in JP Patent 4,145,123.)

A solution of 10 g (73.3 mmoles) of zinc chloride in 15 ml of distilled water was added while stirring vigorously to a solution of 4 g (12 mmoles) of potassium hexacyanocobaltate in 75 ml of distilled water. A mixture of 50 ml of tert.-butanol and 50 ml of distilled water was immediately added slowly to the resultant suspension, and the mixture was then stirred for 10 minutes. The solids were isolated by filtration, then stirred for 10 minutes with 125 ml of a mixture of tert.-butanol and distilled water (70/30; v/v), and refiltered. The solid product was then washed for a further 10 minutes with 125 ml of tert.-butanol. After filtration, the catalyst was dried at 50° C. and normal pressure to constant weight.

Yield of dried, pulverulent catalyst: 3.08 g

Elementary analysis:

cobalt=13.6%, zinc=27.35%.

Example 2

Production of zinc/cadmium hexacyanocobaltate (III) catalyst using tert.-butanol as organic complex ligand and 0.9% of cadmium. (This catalyst is referred to as Catalyst B throughout the examples).

A solution of 9 g (66 mmoles) of zinc chloride and 1.34 g (7.3 mmoles) of cadmium chloride in 15 ml of distilled water was added while stirring vigorously to a solution of 4 g (12 mmoles) of potassium hexacyanocobaltate in 75 ml of distilled water. Immediately after this, a mixture of 50 ml of tert.-butanol and 50 ml of distilled water was added slowly to the resultant suspension and the mixture was then stirred for 10 minutes.

The solid material was isolated by filtration, then stirred for 10 minutes with 125 ml of a mixture of tert.-butanol and distilled water (70/30; v/v), and refiltered. The solid material was then washed for 10 minutes with 125 ml of tert.-butanol. After filtration, the catalyst was dried at 50° C. and normal pressure to constant weight.

Yield of dried, pulverulent catalyst: 2.83 g

Elementary analysis:

cobalt=11.8%;

zinc=22.9%;

cadmium=0.9%.

Example 3

Production of zinc/cadmium hexacyanocobaltate (III) catalyst using tert.-butanol as organic complex ligand and 7.1% cadmium. (This is referred to as Catalyst C throughout the examples.)

This catalyst was prepared using the same procedure as set forth above in Example 2, with the following changes/exceptions:

A solution of 7 g (51.3 mmoles) of zinc chloride and 4.0 g (22 mmoles) of cadmium chloride in 15 ml of distilled water was added while stirring vigorously to a solution of 4 g (12 mmoles) of potassium hexacyanocobaltate in 75 ml of distilled water as described previously.

Yield of dried, pulverulent catalyst: 3.32 g

Elementary analysis:

cobalt=16.5%;

zinc=25.2%, cadmium=7.1%

Production of polyether polyols:

General procedure:

50 g of polypropylene glycol starter (having a number average molecular weight of 1,000 g/mol) and 20 mg of catalyst (100 ppm, based on the total amount of polyether polyol to be produced) were placed under a protective blanket of gas (i.e., argon) in a 500 ml capacity pressure reactor and heated to 105° C. while stirring. Propylene oxide (ca. 5 g) was then added in one lot until the pressure had risen to 2.5 bar (absolute). Additional propylene oxide was only added after an accelerated pressure drop was observed in the reactor. This accelerated pressure drop indicated that the catalyst had been activated. The remaining propylene oxide (145 g) was then continuously added at a constant pressure of 2.5 bar (absolute). After all the propylene oxide was added and after a 5 hour post-reaction time at 105° C., the volatile constituents were distilled off at 90° C. (1 mbar) and the reaction products were then cooled to room temperature.

The polyether polyols produced were characterized by measuring the OH values, the double bond contents, as well as the number average molecular weights and molecular weight distributions $M_w/M_n$ (MALDI-TOF-MS).

The induction periods were calculated from the time-conversion curves (propylene oxide consumption [g] plotted against reaction times [min]) from the point of intersection of the tangent at the steepest point of the time-conversion curve with the extended base line of the curve.

Comparison Example 4

A polyether polyol was produced according to the general procedure as described above using Catalyst A (100 ppm). The induction period for this catalyst and the resultant polyether polyol were characterized as follows:

| Induction period: | | 290 min |
|---|---|---|
| Polyether polyol: | OH index (mg KOH/g) | 28.5 |
| | Double bond content (mmoles/kg) | 6 |
| | $M_n$ | 3426 |
| | $M_w/M_n$ | 1.12 |

Example 5

A polyether polyol was produced according to the general procedure as described above using Catalyst B (100 ppm). The induction period for this catalyst and the resultant polyether polyol were characterized as follows:

| Induction period: | | 240 min |
|---|---|---|
| Polyether polyol: | OH index (mg KOH/g) | 28.0 |
| | Double bond content (mmoles)/kg): | 7 |
| | $M_n$: | 3426 |
| | $M_w/M_n$: | 1.03 |

Example 6

A polyether polyol was produced according to the general procedure as described above using Catalyst C (100 ppm). The induction period for this catalyst and the resultant polyether polyol were characterized as follows:

| Induction period: | | 195 min |
|---|---|---|
| Polyether polyol: | OH index (mg KOH/g) | 29.3 |

| | |
|---|---|
| Double bond content (mmoles)/kg): | 8 |
| $M_n$: | 3324 |
| $M_w/M_n$: | 1.06 |

A comparison of Examples 5 and 6 with Comparison Example 4 clearly shows that the induction periods in the production of polyether polyols using the zinc/metal hexacyanocobaltate (III) catalysts of the present invention were considerably lower compared to when a conventional zinc hexacyanocobaltate (III) DMC catalyst was used. It also demonstrates that the molecular weight distributions of the polyether polyols produced according to the invention were substantially narrower than in the corresponding polyols produced using conventional zinc hexacyanocobaltate (III) DMC catalysts.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A zinc/metal hexacyanocobaltate complex compound corresponding to the formula:

$$Zn_{3-v}M_v[Co(CN)_6]_2 \cdot w(H_2O) \cdot x(L) \cdot y[Zn(X)_n] \cdot z[M(Y)_m)],$$

wherein:
M represents a divalent metal atom selected from the group consisting of cadmium (II), mercury (II), palladium (II), platinum (II), vanadium (II), magnesium (II), calcium (II), barium (II), iron (II), nickel (II), manganese (II), cobalt (II), tin (II), lead (II), strontium (II) and copper (II);
X and Y are the same or different, and each represents a halide, or a hydroxy, sulfate, carbonate, cyanate, thiocyanate, isocyanate, isothiocyanate, carboxylate, oxalate or a nitrate group,
L represents an organic complex ligand selected from the group consisting of alcohols, aldehydes, ketones, ethers, esters, amides, ureas, nitriles or sulfides,
v represents a number from 0.005 to 2.995,
w represents a number from 0.1 to 10,
x represents a number from 0.01 to 10,
y represents a number from 0.001 to 3.0,
z represents a number from 0.001 to 3.0,
and
m and n are the same or different, and each represents the number 1 or 2.

2. The compound of claim 1, wherein, in formula (I),
M represents a divalent metal atom selected from the group consisting of cadmium (II), mercury (II), palladium (II), platinum (II), vanadium (II), magnesium (II), calcium (II) and barium (II);
X and Y are the same or different, and each represents a halide;
L represents an organic complex ligand selected from the group consisting of alcohols, ketones and ethers; and
v represents a number from 0.01 to 2.99.

3. The compound of claim 2, wherein X and Y are the same or different and each represents chloride or bromide.

4. The compound of claim 1, wherein X and Y, and m and n are selected such that the compound corresponds to the formula:

$$Zn_{3-v}M_v[Co(CN)_6]_2 \cdot w(H_2O) \cdot x(L) \cdot y(ZnCl_2) \cdot z(MCl_2) \quad (II)$$

wherein:
v represents a number from 0.005 to 2.995
w represents a number from 0.1 to 10,
x represents a number from 0.01 to 10,
and
y and z are the same or different, and each represents a number of from 0.001 to 3.0.

5. The compound of claim 1, wherein M, X and Y, L, and m and n, are selected such that the compounds correspond to the general formula:

$$Zn_{3-v}Cd_v[Co(CN)_6]_2 \cdot w(H_2O) \cdot x(tert.\text{-}butanol) \cdot y(ZnCl_2) \cdot z(CdCl_2) \quad (III)$$

wherein:
v represents a number from 0.005 to 2.995
w represents a number from 0.1 to 10,
x represents a number from 0.01 to 10,
and
y and z are the same or different, and each represents a number of from 0.001 to 3.0.

6. A process for the production of the zinc/metal hexacyanocobaltate complex compounds of claim 1, comprising
A) reacting
(1) a 1 to 90% by weight aqueous solution of
(a) a zinc salt corresponding to the formula $Zn(X)_n$,
and
(b) a metal salt of the formula $M(Y)_m$,
wherein:
X, Y, m and n are as defined in claim 1;
with
(2) a 0.5 to 50% by weight aqueous solution of a cobalt (III) cyanide salt corresponding to the formula $$M'_3[Co(CN)_6]_r,$$

wherein:
r represents the number 1 or 2,
and
M' represents an alkali metal or an alkaline earth metal, in the presence of organic complex ligands of the formula L with L being defined as in claim 1; wherein the salts $Zn(X)_n$ and $M(Y)_m$, the cobalt (III) cyanide salt, and the complex ligand L are present in such amounts that:

(i) the molar ratio of zinc and metal M to cobalt (III) is 2:1 to 10:1,
(ii) the molar ratio of zinc and metal M to L is 1:100 to 100:1,
and
(iii) the molar ratio of zinc salt $Zn(X)_n$ to metal salt $M(Y)_m$ is 500:1 to 1:500.

7. The process of claim 6, wherein M' represents sodium, potassium, lithium or calcium.

8. The process of claim 6, wherein the salts $Zn(X)_n$ and $M(Y)_m$, the cobalt(III) cyanide salt, and the complex ligand L are present in such amounts that:
  (i) the molar ratio of zinc and metal M to cobalt (III) is 2.25:1 to 8:1,
  (ii) the molar ratio of zinc and metal M to L is 1:50 to 50:1,
  and
  (iii) the molar ratio of zinc salt $Zn(X)_n$ to metal salt $M(Y)_m$ is 300:1 to 1:300.

9. The process of claim 6, wherein the zinc salt $Zn(X)_n$ is selected from the group consisting of zinc chloride and zinc bromide.

10. The process of claim 6, wherein the metal salt $M(Y)_m$ is selected from the group consisting of the metal chlorides and the metal bromides.

11. The process of claim 6, wherein the cobalt (III) cyanide salt is potassium hexacyanocobaltate (III).

* * * * *